United States Patent [19]

Walker

[11] 4,178,347
[45] Dec. 11, 1979

[54] PROCESS FOR THE SIMULTANEOUS PRODUCTION OF WET PROCESS PHOSPHORIC ACID AND SODIUM SILICOFLUORIDE

[75] Inventor: Ford T. Walker, Channahon, Ill.

[73] Assignee: Olin Corporation, New Haven, Conn.

[21] Appl. No.: 906,889

[22] Filed: May 17, 1978

[51] Int. Cl.$^2$ ............................................. C01B 25/22
[52] U.S. Cl. ................................. 423/185; 423/321 R
[58] Field of Search .................... 423/185, 320, 321 R, 423/341, 167

[56] References Cited

U.S. PATENT DOCUMENTS

| | | | |
|---|---|---|---|
| 1,456,594 | 5/1923 | Howard | 423/185 |
| 3,055,733 | 9/1962 | Lang et al. | 423/185 |
| 3,494,736 | 2/1970 | Carothers et al. | 423/321 R |
| 3,498,746 | 3/1970 | Smaltz et al. | 423/320 |
| 3,498,747 | 3/1970 | Smaltz et al. | 423/320 |
| 4,117,091 | 9/1978 | Kongpricha | 423/320 |

OTHER PUBLICATIONS

Galver, A. G., Hensley, J. D. C., "The Design of Void Spray Tower for Silicon Tetrafluoride Absorption," paper read before the Fertilizer Society, Oct. 27, 1960.

*Primary Examiner*—O. R. Vertiz
*Assistant Examiner*—Wayne A. Langel
*Attorney, Agent, or Firm*—William A. Simons; T. P. O'Day

[57] ABSTRACT

A process for recovering fluorine and silicon values from a waste-water stream produced in a wet-process phosphoric acid process which comprises:
(a) diluting concentrated sulfuric acid with the wastewater stream and producing an $SiF_4$-containing gas during the dilution;
(b) scrubbing the $SiF_4$-containing gas with phosphoric acid to produce a phosphoric acid solution containing fluosilicic acid;
(c) reacting sodium carbonate with the phosphoric acid solution to precipitate solid sodium silicofluoride; and
(d) separating the solid sodium silicofluoride from the phosphoric acid.

4 Claims, No Drawings

PROCESS FOR THE SIMULTANEOUS PRODUCTION OF WET PROCESS PHOSPHORIC ACID AND SODIUM SILICOFLUORIDE

BACKGROUND OF THE INVENTION

1. Field of the Invention

This invention relates to the simultaneous manufacture of wet process phosphoric acid and sodium silicofluoride. More particularly, this invention relates to the recycling of waste-water streams, such as gypsum pond water, to recover $P_2O_5$, fluoride and silica values contained therein and reduce pollution of the waterways and the air.

2. Description of the Prior Art

The manufacture of wet process phosphoric acid employs voluminous amounts of water. For example, large amounts of water are normally required for sulfuric acid dilution and product recovery stages. During such acid production, a large portion of process water ends up in an aqueous slurry containing considerable amounts of gypsum, sulfuric acid, $P_2O_5$, as well as varying minor amounts of fluorine, silicon and other impurities. This aqueous slurry is routinely passed to one or more large gypsum ponds where insoluble materials settle out and a waste-water solution (i.e., also known as gypsum pond water) is formed containing soluble $P_2O_5$, fluorine and silicon values along with other impurities.

Because of the relatively large amounts of such gypsum pond water produced at each facility, it is usually necessary to re-use at least a portion of the gypsum pond water to recover the economically valuable $P_2O_5$, to reduce fresh water requirements, and to avoid polluting other water sources in the area.

In particular, it is known to use gypsum pond water in the dilution of sulfuric acid, such as is described in U.S. Pat. Nos. 3,498,746 and 3,498,747, issued to R. G. Smaltz et al on March 3, 1970 and in U.S. application Ser. No. 697,179, filed by S. Kongpricha on June 17, 1976 now U.S. Pat. No. 4,117,091. All three of these references are incorporated herein by reference in their entirety. However, while these three prior art teachings describe methods for recovering $P_2O_5$ values from gypsum pond water, they do not provide any means for recapturing fluorine and silicon values contained in the gypsum pond water without the employment of more water. Furthermore, the dilution of the concentrated $H_2SO_4$ by the processes described in these prior art references may cause $SiF_4$, and possibly HF, gases to be evolved, thereby possibly causing air pollution. Still further, it has been found that scrubbing the evolved $SiF_4$ and HF gases with water, either fresh water, process water or waste-water streams such as gypsum pond water, will not work well since the water cannot be put back into the phosphoric acid process without diluting the acid product. Also, such scrubbing water cannot be readily disposed of bacause of the fluorine and silicon values contained therein. Finally, return of such scrubbing water back to gypsum ponds would be the remaining choice, except that the residual fluorine and silicon values would be lost.

Therefore, it would be advantageous if an alternative scrubbing liquid besides water could be employed in the scrubbing of $SiF_4$ and HF gases evolved during the dilution of the concentrated $H_2SO_4$ with gypsum pond water whereby acid dilution and disposal problems may be eliminated and additional fluorine and silicon values may be recovered. The present invention provides such an alternative.

BRIEF SUMMARY OF THE INVENTION

The present invention is directed towards a process for recovering fluorine and silicon values from a waste-water stream produced in a wet-process phosphoric acid process which comprises:

(a) diluting concentrated sulfuric acid with the waste-water stream and producing an $SiF_4$-containing gas during the dilution;

(b) scrubbing the $SiF_4$-containing gas with phosphoric acid to produce a phosphoric acid solution containing fluosilicic acid;

(c) reacting sodium carbonate with the phosphoric acid solution to precipitate solid sodium silicofluoride; and (d) separating the solid sodium silicofluoride from the phosphoric acid.

DETAILED DESCRIPTION

In the production of wet process phosphoric acid, a phosphate rock slurry is usually first acidulated by digestion with aqueous sulfuric acid. The calcium phosphate of the rock is converted to phosphoric acid and calcium sulfate dihydrate or gypsum, which is then usually separated by filtration. The gypsum filter cake is washed thoroughly to recover as much $P_2O_5$ values as possible. Then, the cake is usually slurried with water and pumped to waste storage where the solids are deposited and the liquid drains away to form a wastewater pond. This pond water is normally an aqueous solution containing $P_2O_5$, sulfuric acid, gypsum, fluorine, silicon and other values.

Concentrations of phosphates, expressed in terms of $P_2O_5$, found in such waste-water streams may range from about 500 to about 15,000 parts per million parts by weight. Concentrations of gypsum, expressed in terms of CaO, found in the waste-water stream can range from about 1,000 to about 5,000 parts per million parts by weight in the waste-water. Concentrations of fluorine, expressed as F, may range from about 100 to about 5,000 parts per million parts by weight in the waste-water stream. Concentrations of silicon, expressed as $SiO_2$, may range from about 100 to about 10,000 parts per million parts by weight in the waste-water stream. These concentrations of fluorine and silicon impurities normally result from impurities originally present in the phosphate rock.

In particular, concentrated sulfuric acid at a concentration of above 80%, preferably above 82%, and more preferably above 90% $H_2SO_4$ by weight, is admixed with the gypsum-containing waste-water stream in a mixing zone to form a diluted acid solution containing about 65% to 80%, preferably from about 65% to about 78%, and more preferably from about 70% to about 77% by weight of $H_2SO_4$. This diluted $H_2SO_4$ is now suitable for digestion of the phosphate rock.

For purposes of the present invention, this $H_2SO_4$ dilution may be carried out in any suitable manner, for example, by those methods disclosed by the above-cited references or other conventional methods. It is only necessary that the waste-water stream employed for such dilution contain minor amounts of fluorine and silicon and that $SiF_4$ gas be evolved during the dilution. The $SiF_4$ gas is volatilized from the mixture of waste-water and acid mainly because of the high acidity of the system and the elevated temperatures caused by the heat of dilution. The reaction mechanism for the formation of $SiF_4$ gas in this situation is not exactly known, but it is theorized that $SiF_6$ ions present in the wastewater stream react with the $H_2SO_4$ in some fashion to form $SiF_4$. The amount of $SiF_4$ gas evolved will, of course, depend on many factors, such as amount of F and Si in the waste-water, the dilution method, temperature and the like. Under most conditions, the resultant concentration of $SiF_4$ gas evolved will be less than about 5 grams per cubic foot of gas over the diluted acid. Usually, the $SiF_4$ concentration will be in the range from about 1 to about 3 grams per cubic foot of gas.

If there is moisture in the atmosphere above the diluted acid, a portion of the evolved $SiF_4$ gas may combine with this moisture to form HF gas which may be both corrosive to surrounding steel and other materials and noxious to personnel working nearby. Therefore, to prevent the formation of HF gas, it is highly desirable to eliminate the introduction of moisture into the atmosphere containing this $SiF_4$ gas. This can be easily done by substantially enclosing this atmosphere from the ambient atmosphere and requiring all air entering the $SiF_4$-containing atmosphere to be dried first. A conventional air drier such as a silica gel drier can be conveniently used to dry such moisture containing air.

The present invention is primarily based on the discovery that phosphoric acid may be employed to scrub this $SiF_4$-containing gas and thereby remove the $SiF_4$ from the gas and convert it into liquid $H_2SiF_6$ which is soluble in the phosphoric acid. The scrubbing may comprise spraying phosphoric acid over the gas before it exits into the ambient atmosphere. In a preferred operation, ambient air is pulled through a drier and then mixed with $SiF_4$ gas evolved from the diluted acid and finally passed through the scrubber before exiting into the ambient atmosphere. But, before this moving gas stream is allowed to exit into the atmosphere, it is subjected to a spraying operation wherein the phosphoric acid solution is sprayed through the gas stream. This spraying or scrubbing causes the gaseous $SiF_4$ and HF, if any, to be entrained in the liquid and to be substantially converted (i.e., over 90% by weight) to $H_2SiF_6$. Other conventional scrubbing techniques besides spraying may be used if desired.

It is theorized that the $SiF_4$ is absorbed into phosphoric acid in the following manner:

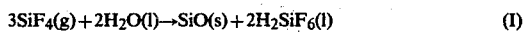

$$3SiF_4(g) + 2H_2O(l) \rightarrow SiO_2(s) + 2H_2SiF_6(l) \quad (I)$$

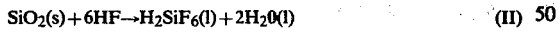

$$SiO_2(s) + 6HF \rightarrow H_2SiF_6(l) + 2H_2O(l) \quad (II)$$

Reaction (I) illustrates that the $SiF_4$ gas reacts with $H_2O$ in the phosphoric acid to form solid silica and liquid fluosilicic acid. Reaction (II) illustrates that the silica formed in Reaction (I) will react with the fluoride normally present in minor amounts in wet process phosphoric acid and any HF in the gas phase. However, if there is not adequate fluoride in the acid to completely react with all the formed silica of Reaction (I), then this solid silica will be suspended in the acid until removed by filtration.

Any suitable concentration of phosphoric acid may be utilized as the scrubbing solution. Preferably, phosphoric acid solutions containing from about 25% to about 40% by weight, more preferably from about 27% to about 35% by weight, $P_2O_5$ may be employed. Normally, the phosphoric acid solution already contains some $H_2SiF_6$. Desirable sources of phosphoric acid in a normal production plant useful for this scrubbing include acid solutions being stored or in process lines.

The amount of phosphoric acid used for scrubbing the $SiF_4$-containing gases may be any amount required to effect removal of substantially all (i.e., over 90% by weight) of the $SiF_4$ from the gas. Of course, this amount of phosphoric acid would depend upon the particular scrubbing system being employed. For one particular system, which used multiple spraying nozzles, it has been found that about five gallons per minute of phosphoric acid is sufficient to scrub substantially all of the $SiF_4$ and HF from the dilution gas wherein the original concentration of $SiF_4$ in the gas is about 2 grams per cubic foot of gas and the gas is vented at a rate of less than 100 cubic feet per minute. After scrubbing, the cleaned gas has unobjectionable quantities of $SiF_4$ and HF gases contained therein and does not cause any air pollution problems.

The used phosphoric acid solution now containing an increased level of $H_2SiF_6$ can now be directly reacted with sufficient amounts of sodium carbonate to result in total neutralization of fluosilicic acid in the acid into the desirable product, sodium silicofluoride. Alternatively, the phosphoric acid employed for this scrubbing operation may be first returned to a main phosphoric acid process stream which is to be later treated with sodium carbonate to form sodium silicofluoride. This reaction can be illustrated as follows:

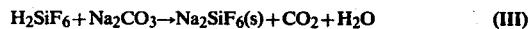

$$H_2SiF_6 + Na_2CO_3 \rightarrow Na_2SiF_6(s) + CO_2 + H_2O \quad (III)$$

Upon reaction of $H_2SiF_6$ and $Na_2CO_3$, the formed sodium silicofluoride will precipitate. This product can be recovered from the phosphoric acid solution by conventional techniques including filtrating, centrifugating, decanting, and the like. One recovery method of sodium silicofluoride is to first remove the solid $Na_2SiF_6$ from the acid solution by any conventional liquid/solid separation means followed by drying the resulting solid cake. The $Na_2SiF_6$ is used chiefly for water fluoridation and as a laundry sour. It should be understood that the production of $Na_2SiF_6$ by the reaction of $Na_2CO_3$ and $H_2SiF_6$ contained in phosphoric acid is a well-known commercial process and any process parameter for this reaction is not a part of the present invention.

The phosphoric acid solution which has had the $H_2SiF_6$ removed therefrom may be now sold commercially or used to make other other useful phosphate materials such as sodium phosphates and the like.

While the present invention has been described in terms of scrubbing $SiF_4$ gas formed in the dilution of concentrated $H_2SO_4$, it should be realized that this scrubbing with phosphoric acid may be applied with appropriate modifications to other steps in a phosphoric acid plant where the evolution of $SiF_4$ and HF gases presents a problem, such as in the digestion of the phosphate rock.

Concentrated sulfuric acid (93% by weight $H_2SO_4$) is diluted with gypsum pond water that contains from about 500–15,000 ppm $P_2O_5$, about 1,000–5,000 ppm gypsum, about 100–5,000 ppm F, and about 100–10,000 ppm $SiO_2$. Sufficient gypsum water is employed so that the concentration of $H_2SO_4$ is lowered to about 77% by weight. The dilution occurs in a mixing tee, where a large heat of dilution may be generated. Immediately, the mixture is passed through a cooler or heat exchanger where the temperature of the mixture is lowered to about 100° F. From the heat exchanger, the mixture is passed to a pump tank, whose volume is controlled by a level control. Next the mixture is transferred to a storage tank. Both tanks, the mixing tee and the heat exchanger are enclosed so that no vapors (e.g., $SiF_4$ or HF) can escape to the ambient atmosphere.

As an important part of the present invention, a scrubber apparatus is attached to each of the tanks. Each scrubbing apparatus comprises the combination of a fan (capacity: 100 cubic foot per minute) or the tank pressure itself to force the passage of a gas stream through a scrubber, a silica drier for drying incoming ambient air before such air is mixed with any vapors evolved from the diluted acid and passed through the scrubber, and a scrubber which consists of a 10-inch diameter pipe with multiple spray nozzles. A catch tank, agitator, and scrubber liquor recycle pump are located below each scrubber. In operation, $SiF_4$-containing gas evolved from the diluted $H_2SO_4$ will be carried away with the dried air stream through the scrubber before exiting into the atmosphere. In the scrubber, phosphoric acid will be sprayed through the multiple nozzles in order to scrub the $SiF_4$ gas from the gas stream and, thus, convert the $SiF_4$ gas to liquid $H_2SiF_6$ which is soluble in phosphoric acid. After being emitted from the nozzles (i.e., at about 0.75 gallon per minute under 10 psig pressure), the phosphoric acid falls through the scrubber by gravity to the catch basin where it is collected. The used phosphoric acid is recycled back to the phosphoric acid production process and the $H_2SiF_6$ is later removed from the acid by a reaction with $Na_2CO_3$ to form $Na_2SiF_6$ and partially neutralize the phosphoric acid in forming monosodium phosphate.

For this embodiment, suitable phosphoric acid sources for this scrubbing operation include filtered phosphoric acid solution (i.e., containing about 25–36% by weight $P_2O_5$). After the scrubbing operation, the used phosphoric acid is collected and transferred back to the main process stream after the filtration step.

The process of the present invention is further illustrated by the following examples. All parts and percentages are given by weight unless otherwise specified.

EXAMPLE 1

A two-liter sample of phosphoric acid which contained about 27% by weight $P_2O_5$ and 0.0139 grams of F per milliliter of acid was spiked with $SiF_4$ gas to raise the F content to 0.0226 grams per milliliter of acid. The spiking was accomplished by bubbling $SiF_4$ gas through the sample for a few minutes. After the spiking was over, the sample was aerated for four hours by bubbling air through the sample. The F content was again measured and found to be 0.0226 grams per milliliter of acid. Thus, no fluoride was lost upon aeration. This experiment indicates that phosphoric acid will effectively absorb $SiF_4$ gas and convert it into soluble $H_2SiF_6$ and will not lose any fluoride content as vapor within a reasonable time before the $H_2SiF_6$ can be converted into $Na_2SiF_6$.

EXAMPLE 2

A two-liter sample of phosphoric acid which contained about 35% by weight $P_2O_5$ and 0.0195 grams F per milliliter acid was spiked with $SiF_4$ gas to raise the F content to 0.0259 grams per milliliter of acid. Again, the spiking was accomplished by bubbling $SiF_4$ gas through the sample for a few minutes. After the spiking was over, the sample was aerated for four hours by bubbling air through the sample. The F content was measured to be 0.0257 grams per milliliter of acid. This indicates that substantially none of the added acid was lost during prolonged aeration and confirms the experiment of Example 1.

What is claimed is:

1. A process for recovering fluorine and silicon values from a waste-water stream produced in a wet-process phosphoric acid process which comprises:
    (a) diluting concentrated sulfuric acid with said waste-water stream and producing an $SiF_4$-containing gas during said dilution;
    (b) scrubbing said $SiF_4$-containing gas with phosphoric acid to produce a phosphoric acid solution containing fluosilicic acid and recycling said phosphoric acid solution back to the wet process phosphoric acid process;
    (c) reacting sodium carbonate with said phosphoric acid solution after step (b) to precipitate solid sodium silicofluoride; and
    (d) separating said solid sodium silicofluoride from said phosphoric acid.

2. The process of claim 1 wherein said waste-water stream is gypsum pond water.

3. The process of claim 2 wherein said scrubbing is carried out with wet process phosphoric acid containing from about 25% to about 40% by weight $P_2O_5$.

4. The process of claim 3 wherein said diluted sulfuric acid contains from about 65% to 80% by weight $H_2SO_4$.

* * * * *